(12) United States Patent
Kosh

(10) Patent No.: US 6,895,799 B2
(45) Date of Patent: May 24, 2005

(54) PRESSURE GENERATOR FOR PORTABLE INSTRUMENT

(75) Inventor: William Stephen Kosh, Shelton, CT (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 10/736,010

(22) Filed: Dec. 15, 2003

(65) Prior Publication Data

US 2004/0123643 A1 Jul. 1, 2004

Related U.S. Application Data

(62) Division of application No. 10/151,053, filed on May 16, 2002, now Pat. No. 6,672,130.
(60) Provisional application No. 60/317,805, filed on Sep. 8, 2001.

(51) Int. Cl.[7] .............................................. G01L 27/00
(52) U.S. Cl. ...................................................... 73/1.64
(58) Field of Search .............................. 73/1.57–1.59, 73/1.61–1.69, 1.71, 1.72, 168

(56) References Cited

U.S. PATENT DOCUMENTS

| | | | | |
|---|---|---|---|---|
| 3,508,431 A | * | 4/1970 | Richardson et al. | ......... 73/1.64 |
| 4,380,166 A | | 4/1983 | Crombie | |
| 4,655,074 A | * | 4/1987 | Robertson et al. | ........... 73/1.62 |
| 4,658,829 A | * | 4/1987 | Wallace | ...................... 600/488 |
| 4,776,201 A | * | 10/1988 | Jones | .......................... 73/1.62 |
| 4,920,802 A | * | 5/1990 | McMullin et al. | ............. 73/597 |
| 5,016,466 A | * | 5/1991 | Ness et al. | .................... 73/1.64 |
| 5,837,881 A | * | 11/1998 | Martin | ........................ 73/1.68 |
| 6,069,326 A | | 5/2000 | Henson et al. | ........... 178/18.01 |

FOREIGN PATENT DOCUMENTS

| FR | 2 582 400 A | 11/1986 |
|---|---|---|
| FR | 2582400 | 11/1986 |

OTHER PUBLICATIONS

R. Devanathan: "An Automatic Aid for the Calibration of a Differential Pressure Transmitter," Proceedings IECON '86, 1986 International Conference on Industrial Electronics, Control and Instrumentation, vol. 1, pp. 158–163, Sep. 29, 1986 –Oct. 3, 1986.

J.C. Legras: "Etalonnage de capteurs DP sous pression de O á 400 bars", Mesures Regulation Automatisme, vol. 49, No. 9, Jun. 1, 1984.

International Search Report dated Dec. 12, 2002 for PCT/US02/26498.

J–C Legras, "Etalonnage de Capteurs DP Sous Pression de O a 400 Bars", vol. 49, No. 9, Jun. 1, 1984) pp. 45–47,49, 51,52.

R. Devanathan, "An Automatic Aid for the Callibration of A Differential Pressure Transmitter", Proceedings from IECON '86, 1986 International Conference on Industrial Electronics, Control, and Instrumentation, vol. 1, Sep. 29, 1986, pp. 158–163.

* cited by examiner

*Primary Examiner*—Robert Raevis
(74) *Attorney, Agent, or Firm*—Fish & Richardson P.C.

(57) ABSTRACT

A compact, portable and NIST traceable pressure source dynamically generates very low pressures includes at least one adjustable valves in-line with a fluid, such as air, flowing through the valve. A differential pressure is created across a pressure control device downstream from the valve. The differential pressure varies depending on the volume of the gas flow and the amount of resistance to the gas flow. The pressure generating device utilizes a miniature pump to create a pressure, or, alternatively, a vacuum, that causes gas flow. The pressure generating device is compact and capable of providing a very low and stable differential pressure by using a dynamic flow that compensates for temperature changes and volume changes. The compact module may be configured as a plug-in module for existing handheld calibrators for operator ease of use.

2 Claims, 3 Drawing Sheets

PRESSURE GENERATOR FOR PORTABLE INSTRUMENT

RELATED APPLICATIONS

This application is a divisional of U.S. patent application Ser. No. 10/151,053, filed on May 16, 2002, now granted as U.S. Pat. No. 6,672,130, which claimed priority to U.S. Provisional Application Ser. No. 60/317,805, filed Sep. 8, 2001.

BACKGROUND OF THE INVENTION

1. Technical Field of the Invention

This invention relates generally to calibration of pressure sensing equipment, and more particularly to dynamic pressure differential generation for handheld calibration of pressure measuring instruments.

2. Description of Related Art

To calibrate instruments, such as differential pressure transmitters in HVAC (Heating, Ventilation and Air Conditioning) Systems in-place, a NIST (National Institute of Standards and Technology) traceable handheld calibrator is typically used to provide an accurate reading of a pressure differential between two pressure lines. One method typically used to provide pressure to the pressure lines is with large units using a static pressure source. Typically, a static pressure is provided by compressing a closed volume of air a desired amount to obtain a higher pressure within a high pressure line. A low pressure line provides either ambient pressure or another reference pressure. A handheld calibrator is used to provide an accurate reading of the pressure differential between the two pressure lines. When a sensor in an instrument to be calibrated is exposed to the pressure differential, the readings from the instrument may be adjusted or verified to match the readings of the NIST traceable handheld module. In this way, the instrument sensor may be calibrated. A drawback associated with the use of a static pressure source is that, when measuring very small pressure differentials, e.g. 0.01" WC (approximately ¹⁄₂₇₀th of a psi), even slight temperature changes can affect the pressure within a closed volume. Minor leaks are also a problem with closed volume systems. Therefore, it is typically difficult to generate and maintain the constant pressures over time. The inability to maintain constant pressures over time causes difficulties in calibrating instruments that require field calibration and verification. Field calibration verification in Biotech/Pharmaceutical applications is mandated by agendes, such as the FDA (Food and Drug Administration). Due at least in part to the above mentioned difficulties, many users have a very difficult time with instrument calibration.

Another type of pressure source used for instrument calibration is a dynamic pressure generator. Dynamic pressure generators are large apparatuses, typically confined to table top use in a laboratory.

SUMMARY OF THE INVENTION

A compact, portable and NIST traceable pressure source for dynamically generating very low pressures is provided. The pressure source has at least one adjustable valve and a pressure generating element in-line with a fluid, such as air. A differential pressure is created across the pressure generating element due to the resistance of flow through the element. The pressure generating element may be a valve or a laminar flow element. The differential pressure varies depending on the volume of the gas flow through the device and the amount of resistance to the gas flow. The pressure source utilizes a miniature pump to create a pressure, or, alternatively, a vacuum, that causes gas flow. The pressure source is a compact device or module and is capable of providing a very low and stable differential pressure by using a dynamic flow that compensates for temperature changes, volume changes and leaks. The compact module may be configured as a plug-in module for existing handheld calibrators for operator ease.

DETAILED DESCRIPTION OF THE EXEMPLARY EMBODIMENTS OF THE INVENTION

Figure 1:
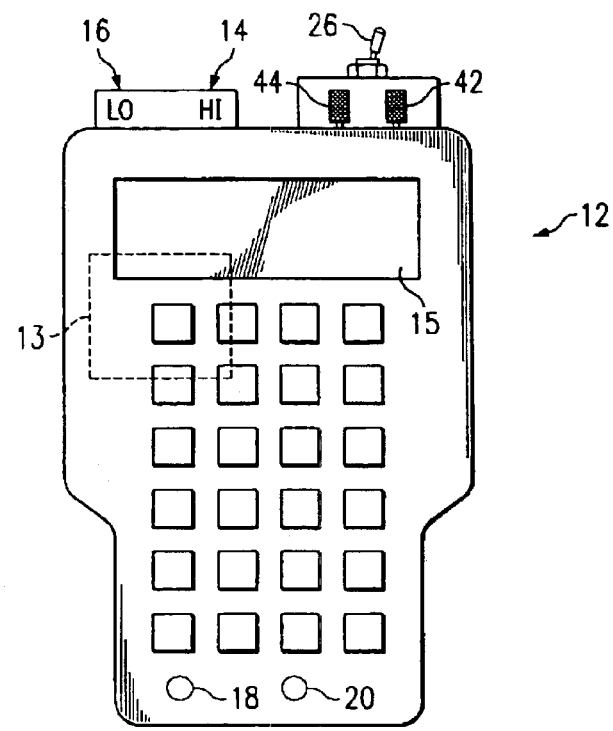
FIG. 1 is a top view of a hand held calibration module with the pressure source of the present invention inserted therein.
Figure 2:
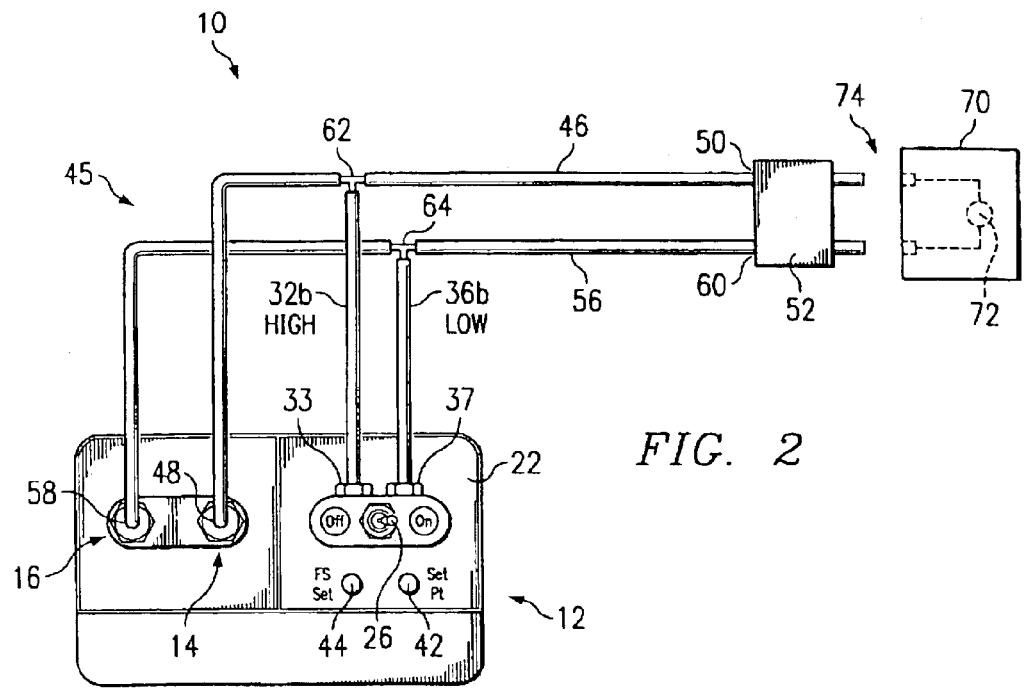
FIG. 2 is a top plan view of the hand held calibration module of FIG. 1 showing the pressure source of the present invention inserted therein.
Figure 3:
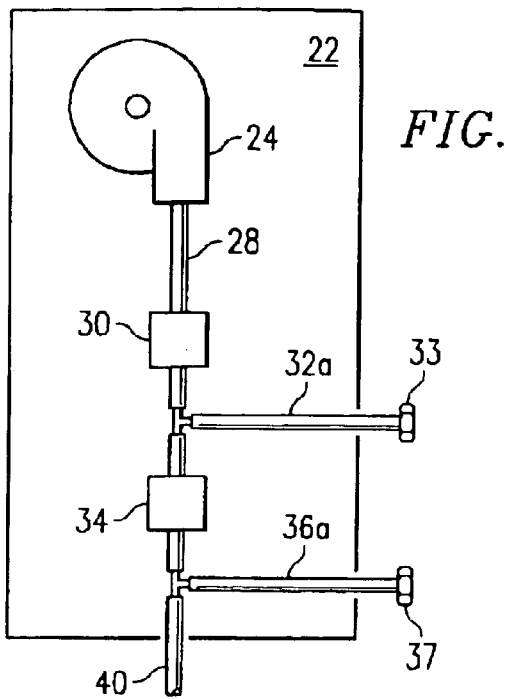
FIG. 3 is a schematic representation of the pressure source shown in FIG. 2.

Referring now to FIGS. 1–3, a pressure calibration system 10 utilizes a prior art hand held module 12. Hand held module 12 has a pressure sensor 13, which is usually calibrated to NIST (National Institute of Standards and Technology) standards, i.e. is NIST traceable. Hand held module 12 has a high pressure input 14 and a low pressure input 16. Hand held module 12 usually has an electrical input/output 18 and 20 (FIG. 1). The ability to measure electrical output through electrical input/outputs 18 and 20 allow the hand held module 12 to perform like an electrical multi-meter. Additionally, hand held module 12 is usually provided with a display screen 15, for displaying data to a user. One example of a hand held measurement instrument can be found in U.S. Pat. No. 6,069,326, which is incorporated by reference in its entirety herein.

A pressure source 22 (FIGS. 2 and 3) is, in the illustrated embodiment, configured as a plug-in module to be inserted into the hand held module 12. The pressure source 22 generates pressure that is used in conjunction with hand held device 12. The pressure source 22 generates a constant pressure which is dynamically controllable and which is used in conjunction with the hand held monitor 12 to create a traceable pressure signal.

Referring now to FIG. 3, the pressure source 22 has a miniature pump 24. An example of a miniature pump 24 is a 2D series pump available from GAST Mfg., Benton Harbor, Mich. 49023. Pump 24 may be powered by a battery located in the hand held module 12 or the pressure source 22 may be provided with a battery. Alternatively, the pressure source 22 may receive power from an external source. An on/off switch 26 (FIGS. 1 and 2) is provided for activating the miniature pump 24. An output line 28 (FIG. 3) is in communication with the miniature pump 24. A flow control valve 30 (FIG. 3) is provided on output line 28. An example of a flow control valve 30 is a F-2822 Series Needle Valve available from Air Logic, Racine, Wis. 53402. Flow control valve 30 sets the volume of flow based on the pressure of miniature pump 24.

A pressure source high pressure line 32a communicates with the output line 28 at a location downstream of flow control valve 30. The pressure source high pressure line 32a terminates at a pressure source high pressure output 33. A pressure generating element 34 is also located on the output line 28. The pressure generating element 34 is located downstream from the pressure source high pressure line 32a and may be a valve of the same type as flow control valve 30 described above. The pressure generating element 34 is used to create less resistance for a lower pressure drop or may be adjusted to create a greater resistance and therefore a greater pressure drop across the pressure generating element 34. A pressure source low pressure line 36a is provided in communication with the output line 28. A pressure source low pressure line 36a terminates at pressure source low pressure output 37. The pressure source low pressure line 36a communicates with the output line 28 at a location downstream of the pressure generating element 34. A vent 40, which may be provided at a terminal end of output line 28, vents pressure from output line 28 at a location downstream of the intersection point of the pressure source low pressure line 36a. A differential pressure is therefore produced in the two lines 32a, 36a, which are shown as horizontal tubes, before and after the pressure generating element 34, as a higher pressure in tube 32a relative to the pressure in line 36a.

The pressure generating element 34 could also be a fixed laminar flow element that creates a pressure differential. An example of such an element would be an arrangement of small tubular elements within a larger output line 28. The axis of the each of the smaller tubular elements would be parallel to the axis of output line 28. The small tubular elements may have any cross sectional shape, i.e. round, hexagonal, triangular, elliptical, etc. The advantage of having a laminar flow element as the pressure generating element 34 is to provide a more stable pressure differential over a broader range of pressures and pressure differentials. Using a fixed laminar flow element as pressure generating element 34 does limit some of the adjustability of the overall unit, but does simplify both construction and operation.

Alternatively, pressure generating element 34 may be an adjustable laminar flow element, thus providing the benefits (including those noted above) of more laminar flow without limiting the adjustability of the unit. This could be achieved by controlling the flow through each of the smaller tubes of a laminar flow element individually or by combining an adjustable valve with a fixed laminar flow element. Accordingly, the pressure source 22 comprises a portable differential pressure generating system or module.

As seen in FIGS. 1 and 2, a "Full Scale (FS) Set" knob 42 is provided for adjusting the flow control valve 30. A "Set Point Knob" 44 is provided for adjusting the pressure generating element 34, and consequently, the pressure available at pressure generator low pressure line output 37. In the majority of applications, when knob 42 is adjusted, knob 44 would be adjusted in an inversely proportional amount. Therefore, knob 42 may be connected with knob 44 to automatically perform this inversely proportionate adjustment. Such a connection could be simple gears, although a belt drive or similar system could be used. In the case of such connection, it may only be necessary for one of the knobs 42, 44 to protrude from the face of the unit.

The pressure calibration system 10 is used to calibrate an instrument 70, which has a pressure sensor 72 located therein. For purposes of example, the instrument 70 may be the pressure measurement apparatus described in prior filed, commonly owned U.S. patent application Ser. No. 09/546, 856, which is incorporated by reference in its entirety herein. Despite the specific reference to the pressure measurement instrument discussed above, it is to be understood that the pressure calibration system 10 of the invention may be used to calibrate other instruments.

Figure 4:
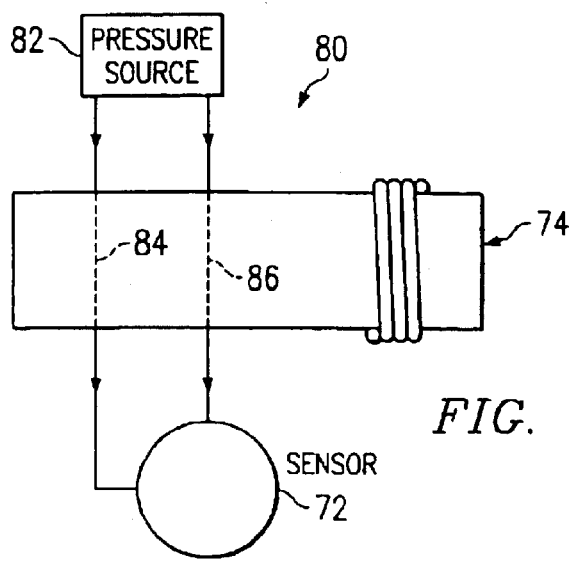
FIG. 4 is a schematic representation of a valve cylinder of an electronic pressure instrument in an operating mode position.
Figure 5:
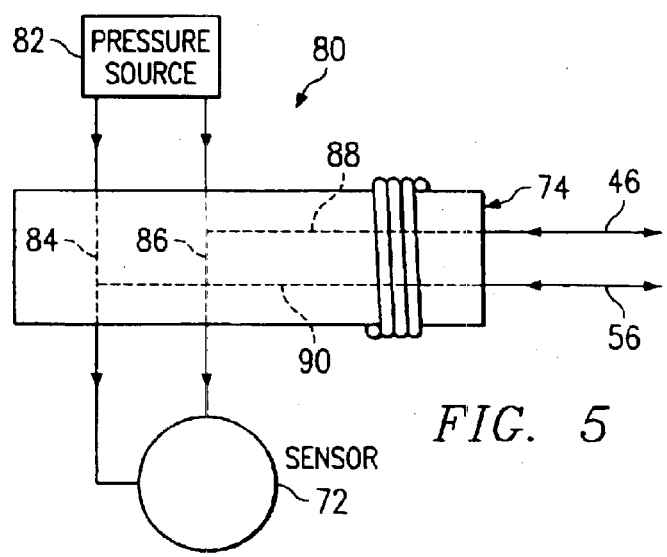
FIG. 5 is a schematic representation of a valve cylinder of an electronic pressure instrument in a monitoring mode position.
Figure 6:
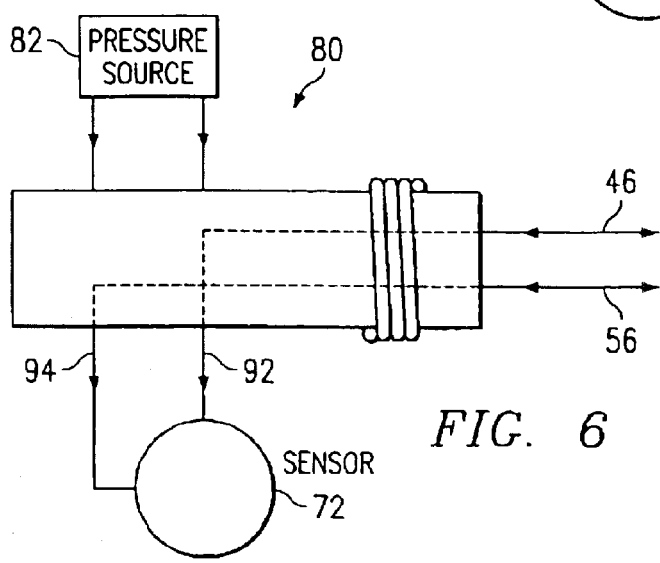
FIG. 6 is a schematic representation of a valve cylinder of an electronic pressure instrument in a calibrating mode position.

Instrument 70 has a valve port 74 (FIGS. 2, 4, 5 and 6) for receiving a probe 52. The instrument 70 should be capable of selectively exposing sensor 72 to the differential pressure between high pressure line 46 and a low pressure line 56 which are coupled to the probe 52. One example of how a pressure may be selectively exposed to a sensor 72 is shown in FIGS. 4, 5 and 6. Referring now to FIG. 4, a valve port 74 is shown on one end of a valve cylinder 80. A pressure source 82 is shown in communication with sensor 72 via pathways 84 and 86.

Referring now to FIG. 5, valve cylinder 80 has been rotated such that pressure from high pressure line 46 and low pressure line 56 are communicated through valve port 74 with pressure source 82 and sensor 72 via lines 84, 86, 88 and 90.

Referring now to FIG. 6, the high pressure line 46 and low pressure line 56 interface with the valve port 74. The valve cylinder 80 has been adjusted to prevent pressure source 82 from communicating with sensor 72. Instead, high pressure line 46 communicates with sensor 72 via line 92. Low pressure line 56 communicates with sensor 72 via line 94.

Of course, other steps may be taken to selectively isolate the pressure source 82, the high and low pressure lines 46, 56, and the sensor 72. Examples include selectively opening and losing a plurality of valves or other means.

Referring now to FIG. 2, a calibration manifold 45 connects the probe 52 to the pressure generating module 22 and to the hand held module 12. The manifold 45 includes a high pressure line 46 which has a first end 48 that communicates with the high pressure input 14 of the hand held module 12. The high pressure line 46 has a second end 50 that communicates with a probe 52. A low pressure line 56 has a first end 58 that communicates with the low pressure input 16 of hand held module 12. The low pressure line 56 has a second end 60 that communicates with the probe 52. A high pressure T-joint 62 is provided in line with the high pressure line 46. The high pressure T-joint 62 joins the high pressure line 46 with a pressure generator high pressure line 32b that is in communication with the pressure generator high pressure output 33. A low pressure T-joint 64 is provided in line with the low pressure line 56. The low pressure T-joint 64 joins the low pressure line 56 with a pressure generator low pressure line 36b, which is in communication with the pressure generator low pressure output 37.

Figure 8:
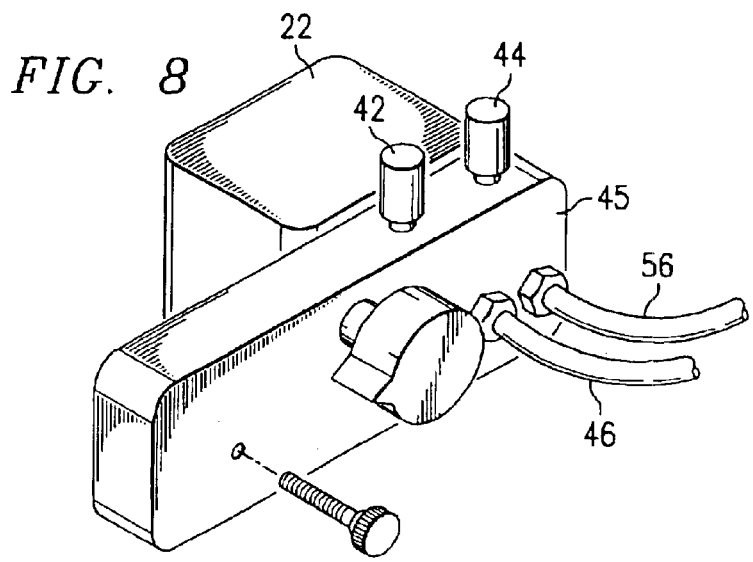
FIG. 8 is a perspective view of a pressure source with a solid calibration manifold.

Referring to FIG. 8, a molded or machined, plastic or metal, calibration manifold 45 may be used to replace the T-joints 62, 64 and parts of the pressure lines 46, 56, 32b, 36b to simplify operation of the pressure generating module 22 and interface with hand held module. For example, a calibration manifold 45 would contain passages that communicate with low pressure input 16 and high pressure input 14 as well as low pressure output 37 and high pressure output 33. The passages would functionally replace high pressure T-joint 62 and low pressure T-joint 64 and have ports for connecting to high pressure line 46 and low pressure line 56. FIG. 2 may be considered a schematic for the interior passages of such a molded or machined, plastic or metal, calibration manifold 45.

In practice, probe 52 is inserted into valve port 74 in the instrument 70. A valve cylinder 80 in instrument 70 or other means are used to isolate the pressure input of high pressure line 46 and low pressure line 56 from acting upon sensor 72 within instrument 70. The flow control valve 30 and the pressure generating element 34 are adjusted to achieve a desired pressure and a desired pressure differential between the pressure source high pressure line 32a, 32b and the pressure source low pressure line 36a, 36b. The calibrated pressure sensor 13 within hand held module 12 converts the pressure differential into electrical signals which are reflected by a numerical display on display screen 21 on hand held module 12. The valve cylinder 80 or other means is used to expose the instrument sensor 72 to the pressure differential between the high pressure line 46 and the low pressure line 56. The reading on sensor 72 is then made and compared with the reading from sensor 13 on the hand held module 12. The instrument sensor 72 may than be calibrated such that the readings of instrument sensor 72 are in agreement with the display 21 of hand held module 12.

Additionally, from the hand held module 12 an electrical calibration may be conducted via the electrical ports 18 and 20.

In one embodiment the hand held module 12 allows an input of maximum pressure and minimum pressure based on the pressure generating module 22. Additionally, minimum electrical and maximum electrical input can be entered. A function is provided that may be labeled "Do %". By initiating this function the hand held module 12 calculates a scale and error of true output, which normalizes the sets of output. Therefore, this feature eliminates the need to have a cardinal pressure for calculating error. For example, by interpolation the hand held module may calculate a 2% error at a 98% full scale. The function nominalizes from zero to 100% as for an input variable that is interpolated. Therefore, a user can determine an error and correct for the error at any location on the full scale.

Figure 7:
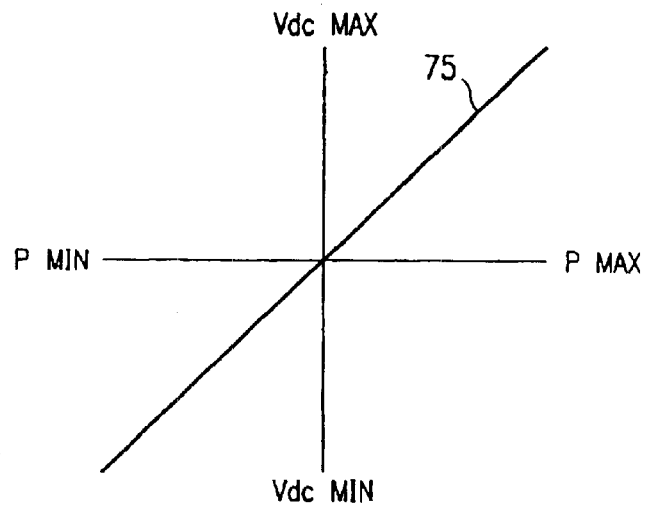
FIG. 7 is a graphical representation of pressure vs. voltage output.

Referring now to FIG. 7, as a further explanation, the x-axis indicates the pressure input from Pmin to Pmax. The y-axis indicates the electrical output of the DUT (device under test), e.g., instrument 70 from Vdc max to Vdc min. A straight line 75 having one end defined by Pmin and Vdc min and a second end defined by Pmax and Vdc max. The % function discussed above causes display screen 21 to display 0 to 100% based on the actual pressure input when compared to the range between the Pmin and Pmax values that have been selected. Therefore, at any time a user is able to discern what percent of the range from Pmin to Pmax is being detected. The display screen 21 may also depict the deviation from the line 75 is depicted as a percent of the range from Vdc min to Vdc max output. For example, if actual pressure is 0.90" WC on input values of 0 Pmin and 1.0" WC Pmax and the electrical output is 8.9 Vdc based on 0 Vdc min to 10 Vdc max, then the display indicates 90.0% on the pressure side and −1.0% on the output side as a deviation or error. Consequently, an operator need not know the pressure or the type of output. Instead, the operator may dial out the −1% error.

The procedure and device described above provides for a stable pressure differential in the single Pascal range; i.e. less than 10 Pa, as well as in the 10 Pa to 100 Pa range. This device and method is also stable for much higher pressure differentials, well into the kilo-Pascal (kPa) range. For reference, 10 Pa is equal to 0.04 inches of water or 0.075 mmHG (millimeters of mercury). Such low pressure differentials are necessary when attempting to calibrate highly sensitive pressure monitoring devices; but can be useful in other applications as well. The portability and stability of this device and the above method make for an ideal instrument for the calibration of pressure monitoring devices.

The applicant's invention advantageously provides a compact, portable and NIST traceable pressure source for dynamically generating relatively low pressures. The pressure source is compact and capable of providing a very low and stable differential pressure by using a dynamic flow that compensates for temperature changes and volume changes. The compact module may be configured as a plug-in for existing handheld calibrators for operator ease. Existing handheld calibrators may be capable of calibrating electrical sensors as well as pressure sensors and other types of sensors. Therefore, it is advantageous to be able to locate all of the calibration functions on an easily transportable device. Other advantages may become apparent from the foregoing descriptions, as well as from the drawings and claims associated with the specification.

I claim:

1. A method for calibrating a pressure measuring instrument comprising the steps of:
   dynamically generating a pressure differential with a pressure source disposed in a handheld device;
   isolating the pressure source from communicating with a pressure sensor in the pressure measuring instrument;
   adjusting at least one valve in the pressure source to achieve a desired pressure differential;
   measuring the pressure differential with calibrated pressure sensor disposed in the handheld device;
   allowing the pressure source to communicate with the sensor in the pressure measuring instrument;
   comparing a pressure reading from the pressure measuring instrument to a pressure reading from the calibrated pressure sensor in the handheld device;
   adjusting the pressure measuring instrument until the pressure reading from the pressure measuring instrument agrees with the pressure reading from the handheld device.

2. A method for calibrating a pressure measuring instrument comprising:
   connecting a high pressure line and a low pressure line to the pressure measuring instrument;
   isolating the high pressure line and the low pressure line from communicating with a pressure sensor in the pressure measuring instrument;
   dynamically generating a pressure differential with a pressure generating module disposed in a handheld device connected to the high pressure line and the low pressure line of the measuring instrument;
   adjusting at least one valve in the pressure generating module to achieve a desired pressure differential;
   measuring the pressure differential with a calibrated pressure sensor disposed in the handheld device;
   allowing the high pressure line and the low pressure line to communicate with the sensor in the pressure measuring instrument;
   comparing a pressure reading from the pressure measuring instrument a pressure reading from the calibrated pressure sensor in the handheld device; and
   adjusting the pressure measurement instrument until the pressure reading from the pressure measuring instrument agrees with the pressure reading from the handheld device.

* * * * *